JAMES SCOTT SMITH, OF HELENA, ARKANSAS.

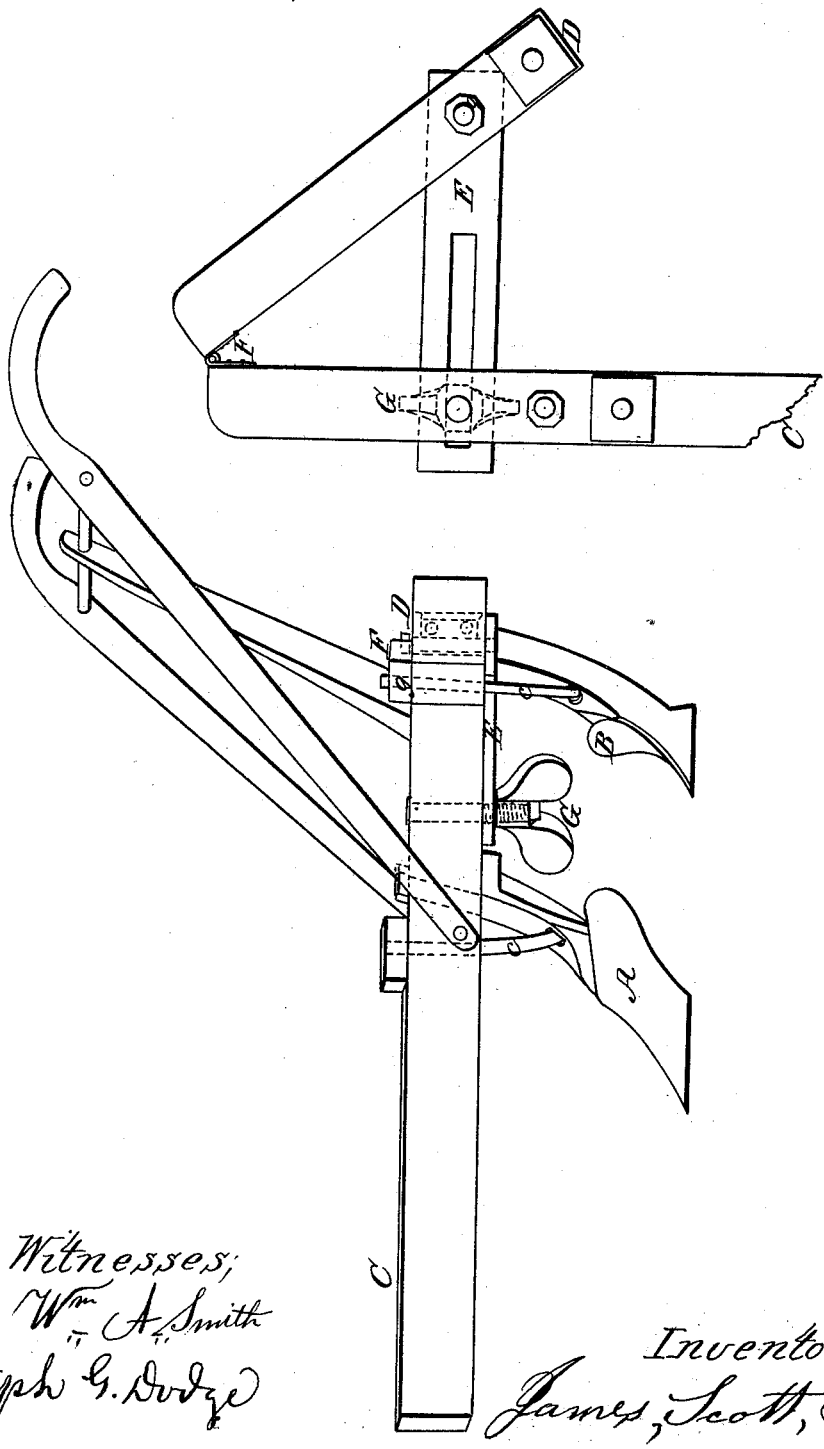

Letters Patent No. 86,185, dated January 26, 1869.

IMPROVEMENT IN CULTIVATOR FOR DIRTING COTTON.

The Schedule referred to in these Letters Patent and making part of the same.

*To all whom it may concern:*

Be it known that I, JAMES SCOTT SMITH, of Helena, in the county of Phillips, in the State of Arkansas, have invented a new and useful Implement for Dirting Cotton; and I do hereby declare that the following is a full and complete description thereof, reference being had to the accompanying drawings, and the letters of reference marked thereon.

A B, half shovel-plow.
C D, beams and frame.
F, hinge.
E, dividing-plate.
G, thumb-screw.
g, shoulder in dividing-plate.
c, brace.

The nature of my invention consists in dirting both sides of the row, the plows straddling the row of young cotton, at one and the same time, by and with the two half shovel-plows, marked A B, attached to the two beams C and D, secured and adjusted by the aid of hinge F, and dividing-plate E, fastened and held securely in place by the aid of thumb-screw G.

By this arrangement, the row can be dirted close to or far from the young, growing plant.

What I claim as my invention, is—

Plows A and B, beams C and D, hinge F, dividing-plate E, and thumb-screw G, all constructed, arranged, and combined, as shown and described.

JAMES SCOTT SMITH.

Witnesses:
WM. A. SMITH,
S. G. DODGE.